United States Patent
Brown et al.

(10) Patent No.: US 7,831,563 B2
(45) Date of Patent: Nov. 9, 2010

(54) ACTIVE STORAGE AND RETRIEVAL SYSTEMS AND METHODS

(75) Inventors: Albert C. Brown, Huntington Beach, CA (US); Robert M. Kreuch, Bothell, WA (US)

(73) Assignee: International Business Machines Corporation, Armonk, NY (US)

(*) Notice: Subject to any disclaimer, the term of this patent is extended or adjusted under 35 U.S.C. 154(b) by 197 days.

(21) Appl. No.: 11/544,872

(22) Filed: Oct. 9, 2006

(65) Prior Publication Data

US 2007/0271306 A1 Nov. 22, 2007

Related U.S. Application Data

(60) Provisional application No. 60/801,185, filed on May 17, 2006.

(51) Int. Cl.
- G06F 7/00 (2006.01)
- G06F 17/00 (2006.01)
- G06F 17/20 (2006.01)
- G06F 17/21 (2006.01)
- G06F 17/22 (2006.01)
- G06F 17/24 (2006.01)
- G06F 17/25 (2006.01)
- G06F 17/26 (2006.01)
- G06F 17/27 (2006.01)
- G06F 17/28 (2006.01)
- G06F 3/00 (2006.01)

(52) U.S. Cl. .............. 707/648; 715/229; 715/716
(58) Field of Classification Search .................. 707/200
See application file for complete search history.

(56) References Cited

U.S. PATENT DOCUMENTS

| 5,950,188 | A  | * | 9/1999 | Wildermuth | 1/1 |
| 6,269,380 | B1 | * | 7/2001 | Terry et al. | 1/1 |
| 6,453,325 | B1 | * | 9/2002 | Cabrera et al. | 1/1 |
| 7,043,486 | B2 | * | 5/2006 | Cope | 1/1 |

(Continued)

OTHER PUBLICATIONS

Douglas B. Terry; Managing Update Conflicts in Bayou, a Weakly Connected Replicated Storage System; 1995; ACM; pp. 1-12.*

(Continued)

*Primary Examiner*—Neveen Abel Jalil
*Assistant Examiner*—Jermaine Mincey
(74) *Attorney, Agent, or Firm*—Janaki K. Davda; Konrad Raynes & Victor LLP

(57) ABSTRACT

A data storage management system comprises a workflow engine, a lifecycle module, and a storage application. The workflow engine is configured to manage a plurality of defined business processes and to execute at least one process step associated with at least one data item. The lifecycle module is configured to detect a change in lifecycle of the at least one data item. The storage application is configured to perform at least one storage action on the data item as a result of the data item reaching a step in a business process, the data item having a change in lifecycle, the data item having a change in metadata, or an event occurring to the data item. Application layer information about data derived from operation of the system allows the system to make more accurate determinations of business value of data and to determine appropriate storage actions to perform on data.

19 Claims, 9 Drawing Sheets

U.S. PATENT DOCUMENTS

2004/0024790 A1* 2/2004 Everett .................. 707/200
2004/0128325 A1* 7/2004 Saika .................... 707/200
2004/0205075 A1   10/2004 LaTurner et al.
2006/0059206 A1* 3/2006 Ushijima et al. ......... 707/200
2006/0080316 A1* 4/2006 Gilmore et al. ........... 707/9
2006/0212487 A1* 9/2006 Kennis et al. ........... 707/200

OTHER PUBLICATIONS

Wikipedia, "Hierarchical Storage Management", [online], [retrieved on Feb. 7, 2008]. Retrieved from the Internet at <URL: http://en.wikipedia.org/wiki/Hierarchical_storage_management>, 3 pp.

Wikipedia, "Information Lifecycle Management", [online], [retrieved on Feb. 7, 2008]. Retrieved from the Internet at <URL: http://en.wikipedia.org/wiki/Information_Lifecycle_Management>, 5 pp.

* cited by examiner

200

ACTIVE STORAGE AND RETRIEVAL SYSTEMS AND METHODS

CROSS-REFERENCE TO RELATED APPLICATIONS

This application claims the benefit of U.S. Provisional Application No. 60/801,185, filed May 17, 2006 and entitled ACTIVE STORAGE AND RETRIEVAL SYSTEMS AND METHODS. The disclosure of the foregoing provisional application is hereby incorporated by reference in its entirety into this application.

BACKGROUND OF THE INVENTION

1. Field of the Invention

The systems and methods disclosed herein relate to the management of content in a storage system.

2. Description of the Related Art

In general, information lifecycle management seeks to manage data storage resources as containers to balance the efficiency of data access with the costs of data storage. One object of information lifecycle management is to store high value data (such as data that is often viewed or modified) on faster but more expensive storage while storing lower value data (such as data that is rarely viewed or modified) on slower but less expensive storage. Information lifecycle management manages storage devices as containers. While one container provides slow and cheap storage, another container may provide fast and expensive storage. Information lifecycle management tools attempt to optimize where data is stored based on various file system statistical characteristics of the data, such as, for example, the age of the data, the last time that the data was accessed, the data's type, and the like. These characteristics, however, poorly reflect the value of any particular data to an organization. Thus, information lifecycle management systems often misclassify data and thereby defeat an organization's attempt to balance business value and storage cost.

SUMMARY OF THE INVENTION

Embodiments of the systems and methods disclosed herein seek to determine the value of data by accessing information available to a content management application such as an enterprise content management system, a business process management system, or the like. For example, embodiments may review a particular data item's process context (e.g. the stage that data item is at within a business process), a data item's lifecycle, events that have occurred to the data item such as invoice approval, and the like. Such application layer factors, alone or combined with storage layer factors such as file system statistics, may provide a more accurate reflection of business value of the data. This allows the enterprises to more directly correlate, at an object level rather than container level, business value and storage characteristics.

In one embodiment, an active storage and retrieval system has access to information about data as it was processed through a workflow engine. In general, a workflow engine is a broad class of software known to an artisan to include one or more applications that manage data as it is routed through one or more business processes. Steps within a business process often include a storage action. Herein, the term "storage action" is a broad term known to an artisan that includes any action that determines either a storage tier or a data format in which data is stored, including, without limitation, storing data in primary storage, storing data in long-term storage, storing data in archival storage, moving data from one storage tier to another, encrypting data, electronically shredding data, designating data as read-only, and the like. In an example of a business process, a business document such as an invoice may be created and stored within primary storage. At another time, the business process may include a step or stage where the invoice is moved to archival storage as it was paid.

Alternatively or additionally, the active storage and retrieval system may interact with a content manager. The content manager allows a user to perform a plurality of actions on a data item, such as, for example, checking a data item into a data repository, checking a data item out of a repository, viewing a data item, filing a data item, deleting a data item, or the like. In addition, the content manager stores metadata about content that provides a context for the content. For example, metadata for one object may show that the object is an invoice for more than one million dollars, while metadata for another object may show that the object is a piece of junk mail. Such metadata advantageously allows the content manager to determine the business value of each object (e.g. an invoice for more than one million dollars is worth more to a business than a piece of junk mail.). Advantageously, the active storage and retrieval system may take an object's context (based on metadata) into account when determining the business value of the object and selecting an appropriate storage strategy based on that business value. The modification of an object's metadata is, in one embodiment, another event that can be tracked by the active storage and retrieval system.

The event listener determines when one of the afore-mentioned events or another event occurs on a data item. The event listener may also handle the event by determining an appropriate event action in response to the event and causing the execution of the event action. For example, if the event listener detects a deletion, the event listener may cause the data item to be electronically shredded for security purposes (e.g. overwritten in a secure way that makes recovery of the data very difficult). Another event that may be detected and handled by the event listener is the setting of a large invoice amount, such as, for example, a ten million dollar invoice amount. In one embodiment, a user may set a storage policy that causes the event listener to detect when such a high value invoice amount has been set, and to move such high value invoices to a robust replicated storage system that requires auditing of the invoice and detects modifications to the invoice. Advantageously, therefore, the active storage and retrieval system, in one embodiment, provides a mechanism to make storage decisions at the object level based on the business value of a particular object.

The event action defined for each event may differ depending on the type of data affected by the event. For example, non-confidential data may not be electronically shredded in response to a delete event. Storage policies may be defined that specify an event action for each event and each type of data.

Alternatively or additionally, the active storage and retrieval system may interact with a lifecycle module. The lifecycle module determines when a particular data item's lifecycle changes and may cause a resulting event action to occur on the data. For example, a lifecycle may include one or more of "draft," "approved," "final," and the like. The lifecycle module may cause a document to be moved to long-term storage when the document's lifecycle is promoted from "approved" to "final." In an embodiment, the event action may occur as a result of the raising, detection, and handling of a lifecycle change event.

Advantageously, in embodiments of the systems and methods described herein, there is interaction between the workflow engine, the lifecycle module, the content manager, and an event listener. For example, the lifecycle module may cause an event action to occur by raising a lifecycle change event that is detected and handled by the event listener. Similarly, a step in a business process may cause an event to occur on a data item that in turn causes a response to the event listener, or a step in a business process may cause a data item to undergo a lifecycle change that may result in a lifecycle action.

Advantageously, because business processes, content metadata, storage policies, and lifecycles can be defined by an organization, the organization can directly influence the storage actions performed on data based on the business value that the organization places on the data. For example, for a business process, the inclusion of a storage action in a step of a process directly reflects the organization's value of data at a particular stage in the process. That is, the inclusion of a step of moving a form to archival storage when processing of the form completes reflects the organization's judgment that the form does not need to be rapidly accessible and can be archived once processing is finished.

Neither this Summary section nor the Detailed Description of Preferred Embodiments purports to define the invention.

DETAILED DESCRIPTION OF PREFERRED EMBODIMENTS

Embodiments of the systems and methods disclosed herein seek to determine the value of data by accessing information available to a content management application such as an enterprise content management system, a business process management system, or the like. For example, embodiments may review a particular data item's process context (e.g. the stage that data is at within a business process), a data item's lifecycle, events that have occurred to the data such as invoice approval, and the like. Such application layer factors, alone or combined with storage layer factors such as file system statistics, may provide a more accurate reflection of business value of the data. This allows the enterprises to more directly correlate, at an object level rather than container level, business value and storage characteristics.

In order to more accurately determine the business value of content and to determine which storage actions to perform on content, the systems and methods disclosed herein take advantage of a content management application's application level knowledge of content. For example, embodiments of the systems and methods described perform storage actions that are triggered by the performance of workflow process steps on particular content. Further, embodiments may perform storage actions that are triggered by changes in content lifecycle, changes in content metadata, and/or the occurrence of events upon particular content. Such application level occurrences more precisely reflect the business value of content than do file system statistics alone. Thus, by performing storage actions based on one or more of the foregoing types of occurrences, the systems and methods described herein allow an organization to more effectively and efficiently store content in storage resources that are better suited for the particular content.

Embodiments of the systems and methods are now described with reference to the drawings. For ease of reference and clarity, elements of the drawings are labeled with reference numbers. The first digit of each reference number indicates the figure upon which the element first appears. Further, where an identical element appears in two figures, the same reference number is repeated in each figure to indicate the identity of the element. The embodiments described herein are illustrative only and the invention is not limited to these embodiments. Rather, a skilled artisan will appreciate, in light of this disclosure, how to implement many alternative embodiments that embody the principles illustrated herein.

Figure 1:
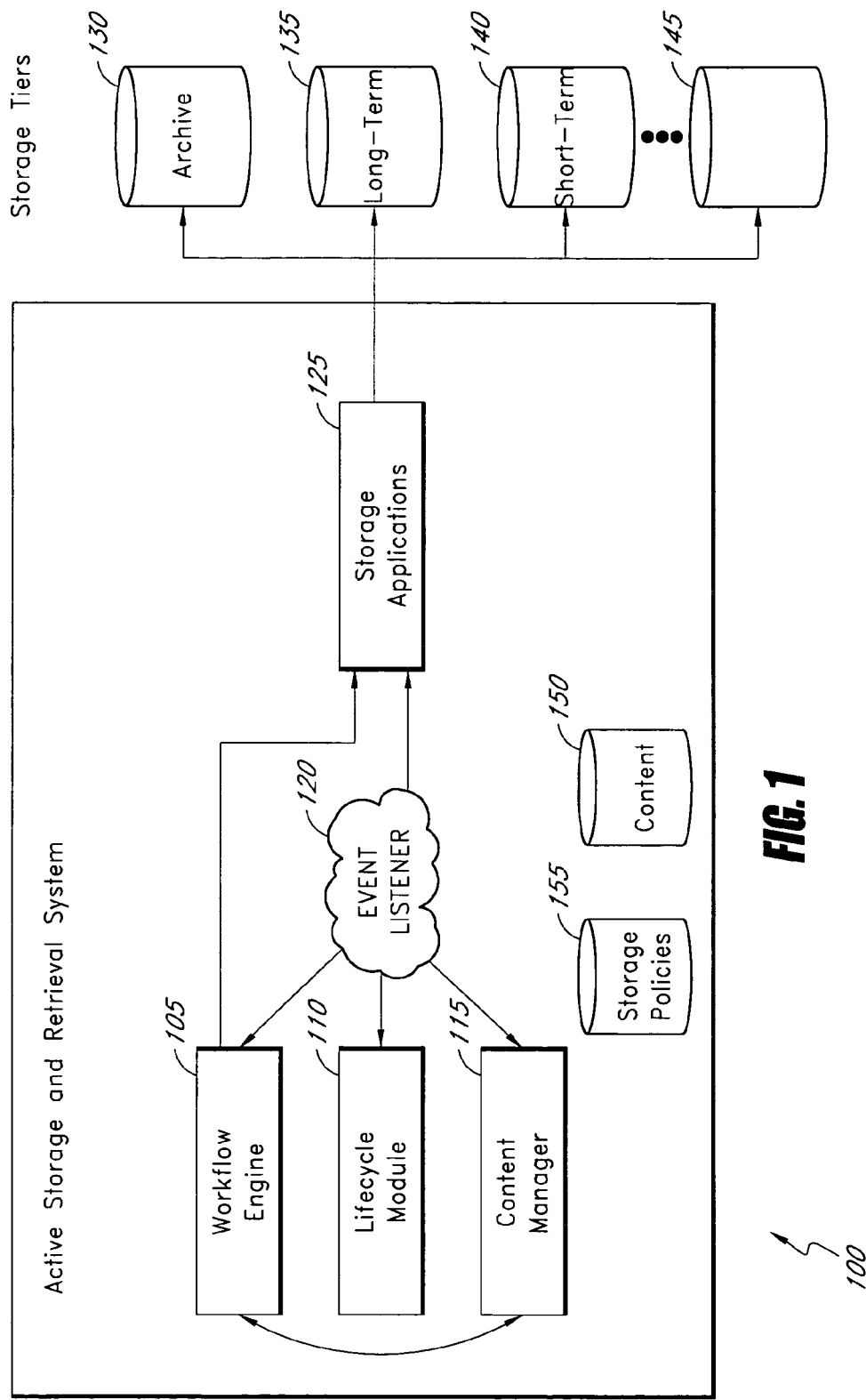
FIG. 1 is a block diagram of an active storage and retrieval system in accordance with one embodiment.

FIG. 1 is a block diagram of an active storage and retrieval system in accordance with one embodiment. In one embodiment, an active storage and retrieval system 100 comprises a workflow engine 105, a lifecycle module 110, a content manager 115, an event listener 120, and storage applications 125. Preferably, the active storage and retrieval system 100 communicates with a number of storage tiers 130, 135, 140, and 145. Such communication preferably occurs through the storage applications 125, but this is not required.

Preferably, each storage tier comprises a type of storage. For example, in the embodiment illustrated in FIG. 1, the storage tiers comprise an archive storage tier 130, a long-term storage tier 135, and a short-term storage tier 140. Also illustrated is an unnamed storage tier 145. As will be appreciated by a skilled artisan, the specific types of storage illustrated by FIG. 1 are illustrative only and are not required. Other types of storage may be used in addition to or in place of the illustrated types of storage. A skilled artisan will also appreciate, in light of this disclosure, that each storage tier advantageously uses storage hardware suitable for the function, within an organization, that the storage tier performs. For example, the archive storage tier 130 may employ magnetic tape drives that provide for the inexpensive storage of large amounts of data but are generally slower than other storage hardware. The short-term storage tier 140, on the other hand, may employ magnetic hard disk drives that provide for more expensive but more rapid random access of data. Storage hardware that provides rapid random access of data is preferably used for storing data that has high business value. A skilled artisan will appreciate that the active storage and retrieval system 100 is not limited so as to be used with the storage hardware specifically described herein, but may be used with any appropriate storage hardware.

The active storage and retrieval system 100 preferably also communicates with content 150 and storage policies 155. The content 150 and storage policies 155 may be part of the active storage and retrieval system 100, as is suggested by the illustration of FIG. 1. Alternatively or additionally, a portion or all of the content 150 and storage policies 155 may exist outside of the active storage and retrieval system 100 but in communication with the active storage and retrieval system 100. For example, in some embodiments, a portion or all of the content 150 is stored in the various storage tiers 130, 135, 140, and 145. In embodiments in which all content is stored in the storage tiers, there need not be content storage apart from the storage tiers. In some embodiments, however, some content is stored apart from the storage tiers. For example, in one embodiment, at least a portion of the content 150 is stored at least temporarily in a cache that is separate from the storage tiers and that allows for high speed retrieval of cached content. As used herein, the term "content" encompasses the ordinary meaning of the term "content" to a skilled artisan, including, without limitation, electronic data of any kind. Additionally, the term "content" is used to describe content accessible to the active storage and retrieval system 100, whether or not such content is stored in the storage tiers 130, 135, 140, and 145.

Storage Policies

Figure 2:
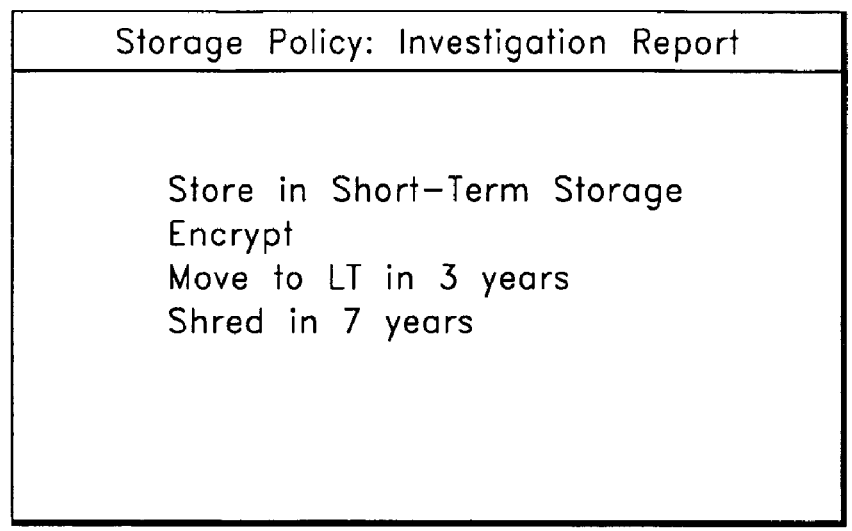
FIG. 2 illustrates a storage policy that may be used in one embodiment of an active storage and retrieval system.

As used herein, the term "storage policy" refers generally to data that defines storage actions to be performed on associated content under associated circumstances. FIG. 2 illustrates an example storage policy 200 in which associated content is to be stored in short-term storage and encrypted, moved to long-term storage in 3 years, and electronically shredded in 7 years. Advantageously, a storage policy is associated with particular content. In one embodiment, the association between particular content and a storage policy occurs at the time the content is created. A skilled artisan will appreciate, however, in light of this disclosure, that the association may occur after content creation, or the associated storage policy may be modified at a later time. Advantageously, the active storage and retrieval system 100 refers to the storage policy associated with particular content and causes the performance of appropriate storage actions when associated circumstances occur. For example, for content associated with the sample storage policy of FIG. 2, the active storage and retrieval system 100 causes the content to be electronically shredded upon determining that the content was created 7 years ago.

A storage policy can be stored in any suitable data structure and can be associated with content in any suitable way. In one embodiment, data reflecting a storage policy is stored one or more metadata fields associated with the content. Alternatively or additionally, a plurality of storage policy records that define all or part of a storage policy may be stored in a database and one or more unique identifiers that reference such records may be stored in association with particular content that uses such storage policy. Preferably, the active storage and retrieval system 100 allows a storage policy associated with particular content to be modified. Thus, in preferred embodiments, the storage policy that is first associated with particular content provides default rules for handling occurrences to the content, but such defaults may be changed by a user, by automatic operation of the active storage and retrieval system 100, or by operation of the active storage and retrieval system 100 with some level of user interaction.

Preferably, the active storage and retrieval system 100 associates a storage policy with particular content based on a classification of the particular content. For example, the system 100 may store a general storage policy that applies, at least as a default, to a class of content known as "investigation reports." Advantageously, the content manager 115 may include tools that allow a user to create an investigation that has defined default attributes, including a default storage policy. Providing such default attributes and storage policies has the advantage that a data entry clerk or similar employee may create a report and have an appropriate storage policy associated therewith, without the clerk having any understanding of what storage policy that the active storage and retrieval system 100 will apply. Advantageously, therefore, the automatic association of a default storage policy may be used to increase compliance with an organization's document and/or data retention policy or other rules regarding the storage, maintenance, and security of documents and/or data. While automatic association of a default storage policy is preferred, alternative embodiments may allow a level of user interaction in the selection of a storage policy, or may not associate a storage policy without explicit user instructions.

By associating storage policies based on a classification of content, the active storage and retrieval system 100 helps ensure that similar content receives similar treatment by the active storage and retrieval system 100 upon the detection of occurrences defined in the associated storage policy. For example, in the context of insurance claim processing, documents such as "investigation reports," which are used to determine whether a claim has merit and should be paid, are generally considered to have high business value and thus require rapid access, confidentiality, and security. Thus, in the example of FIG. 2, a default storage policy for investigation reports specifies that such reports are stored in short-term storage (to provide rapid random access such as a hard disk drive) and encrypted to ensure confidentiality and security. The policy also specifies moving such reports to long-term storage in 3 years, and electronically shredding such reports in 7 years, reflecting that people generally don't need rapid access to such reports years after an incident, and that such reports should be destroyed to guarantee confidentiality many years after an incident.

Content of low value, such as, for example, unsolicited email, may be associated with a storage policy that does not specify encryption, nor moving to long-term storage, nor electronic shredding. Such a policy may be justified for low value content because low value content generally does not require special handling. Rather, low value content may simply be deleted by a user at his or her discretion (or the content may be segregated or deleted automatically, such as by a spam filter).

Triggering of Storage Actions

Generally, in one embodiment, the active storage and retrieval system 100 causes storage actions to occur in relation to content based on one or more of the following occurrences: the performance of a process step in relation to the content, a change in lifecycle of the content, a change in metadata of the content, or an occurrence of an event in relation to the content. As used herein, the term "storage action" encompasses the term's ordinary meaning to a skilled artisan and includes, without limitation, any action that stores content, moves content from one storage location to another, changes the format of content (such as, for example, by encryption), deletes content, electronically shreds content, designates or changes a security level for content (such as, for example, by changing permissions), and the like. Some examples of advantageous storage actions that may occur in one embodiment include encrypting content that has high business value and moving such content to a secure storage location that provides for rapid access of the data. Other examples include storing lower value content in a storage location that is less expensive but that provides for slower access of the data. Advantageously, by performing storage actions based on the afore-mentioned occurrences, the active storage and retrieval system 100 can accurately determine the business value of particular content and thus make a choice regarding which storage actions to perform that increases storage efficiency and security.

Preferably, the active storage and retrieval system 100 chooses which storage action to perform on particular content at least in part by referring to a storage policy associated with the content. Alternatively or additionally, the active storage and retrieval system 100 may determine a storage action to perform based on general rules that are not part of a storage policy. Such general rules may be used in addition to or in place of storage policies. For example, in some embodiments, the active storage and retrieval system 100 may perform a default storage action of storing content in short-term storage in cases where no storage policy is defined. Such default rules advantageously can be used to resolve ambiguity regarding which storage action to perform in cases where no storage policy is defined.

Examples of how each of the foregoing occurrences may cause the active storage and retrieval system 100 to perform a storage action on content will now be described in relation to the embodiment illustrated in FIG. 1. In general, the occurrences that may trigger a storage action result from user interaction with or automatic operation of one or more of the workflow engine 105, the lifecycle module 110, and the content manager 115. One example of an occurrence caused by user interaction is checking out a document from the content 150 using the content manager 115. An example of an occurrence caused by automatic operation is the performance of an automatic process step that is part of a defined workflow and that may be executed by the workflow engine 105. In general, whether an occurrence results from user interaction or automatic operation, the event listener 120 detects such occurrence and invokes one or more of the storage applications 125 in order to cause the performance of an appropriate storage action. The invocation of the storage applications 125 by the event listener 120 is not required, however. Preferably, the workflow engine 105 may also directly invoke the storage applications 125. Indeed, a skilled artisan will appreciate, in light of this disclosure, that the event listener 120 can be omitted entirely such that the workflow engine 105, the lifecycle module 110, and the content manager 115 individually detect occurrences and invoke the storage applications 125 as appropriate. Alternatively, the event listener 120 may invoke the storage applications 125 in some cases, while one or more of the workflow engine 105, the lifecycle module 110, and the content manager 115 may directly invoke the storage applications 125 in other cases.

Performance of a Process Step

In one embodiment, the workflow engine 105 comprises one or more modules configured to define and execute one or more workflows. As used herein, the term "workflow" encompasses the ordinary meaning of the term to a skilled artisan familiar with business process management and includes, without limitation, data that defines one or more steps of a business process that may be associated with and performed on one or more objects. As will be appreciated by a skilled artisan, a workflow may include automated steps, steps that include user interaction, and conditional steps or branches. Details regarding the structure, function, and operation of a workflow in the context of a business process management system are described in U.S. patent application Ser. No. 10/745,346, entitled SYSTEM AND METHOD FOR DIRECTING CONTENT ENTRY, and filed on Dec. 23, 2003, the disclosure of which is hereby incorporated by reference in its entirety.

Figure 3:
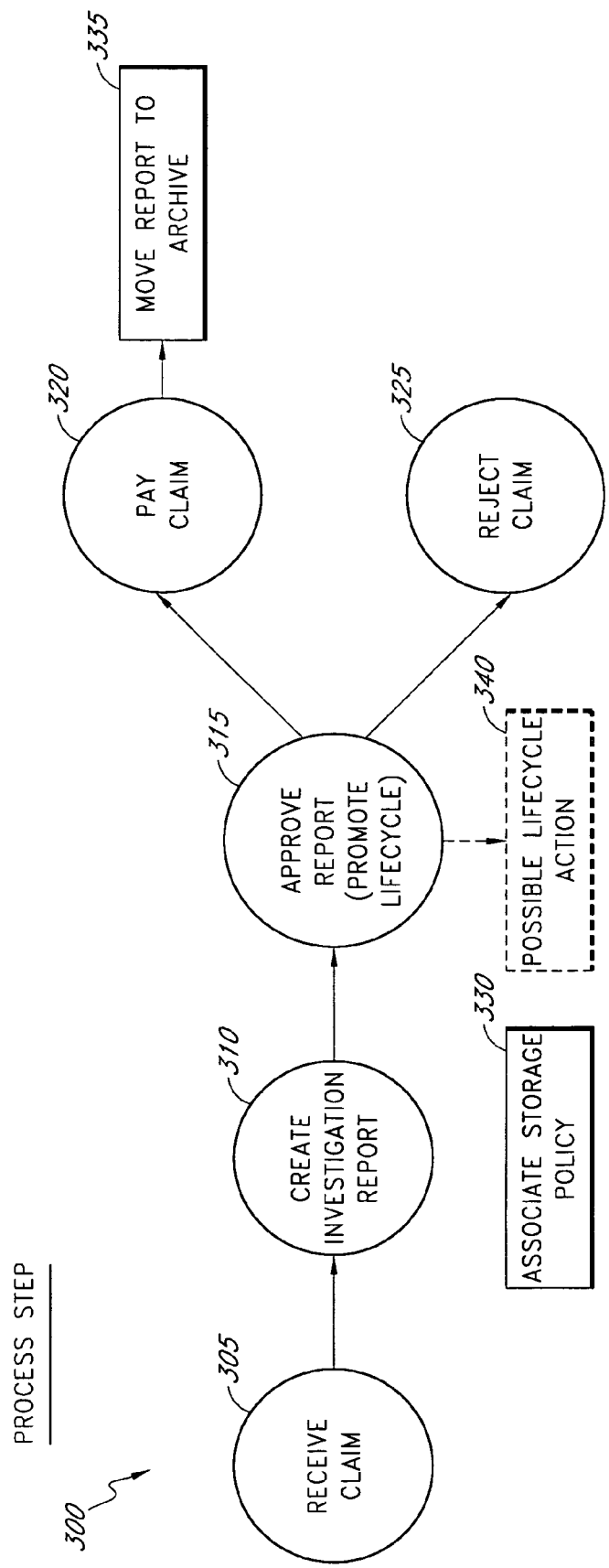
FIG. 3 is a diagram that illustrates how a change in an object's lifecycle may trigger a storage action to occur on the object, in accordance with one embodiment of an active storage and retrieval system.

FIG. 3 illustrates an example workflow that defines a business process for processing an insurance claim. As illustrated, a workflow process 300 may include a plurality of steps related to processing content. The illustrated process 300 defines steps of receiving a claim 305, creating an investigation report 310, approving the investigation report 315, and the conditional steps of either paying the claim 320 or rejecting the claim 325. In one embodiment, when the investigation report is created in step 310, a storage policy may be associated with the investigation report. Block 330 illustrates the association of a storage policy with the investigation report. In one embodiment, the particular storage policy associated with the created content is based on a classification of the created content. Thus, in the illustrated example, the investigation report is associated with a storage policy that is configured for investigation reports. Similarly, an invoice may be associated with a different storage policy that is configured for invoices.

As illustrated by the block 335, a workflow step may cause the performance of a storage action. For example, the block 335 shows that the step 320 of paying a claim causes the investigation report to be moved to archival storage. In this case, the storage action of moving the report to archival storage is a direct result of the performance of the step 320. That is, the instructions to move the report to archival storage are embedded in and are part of the step 320. Advantageously, the ability to embed a storage action within a workflow process step gives a user a great amount of control regarding storage actions. In one embodiment, an embedded storage action is performed on content that reaches the step in the workflow process that includes the embedded storage action without regard to any storage policy associated with the content. Thus, for example, in this embodiment, an explicit command to move an investigation report to archival storage can override a general storage policy that investigation reports are stored in short-term storage and moved to long-term storage in 3 years. Alternatively or additionally, a workflow process step can contain an embedded command that determines which storage action to perform by referring, at least in part, to the storage policy of the affected content. In other embodiments, the ability to override a storage policy may be restricted, such that, for example, a workflow process step may only cause the performance of a storage action that is consistent with the storage policy of the content. Such restrictions may be generally applicable to all storage policies or may apply only to designated storage policies, such that, in some embodiments, some storage policies can be overridden while others cannot.

In addition to directly embedded storage actions, the performance of a workflow process step may indirectly cause the performance of a storage action. As set forth above, a change in lifecycle, a change in content metadata, or an event can cause the performance of a storage action. Accordingly, a workflow process step can indirectly cause the performance of a storage action by causing a change in lifecycle, a change in content metadata, or an event. Block 340 illustrates one such indirect storage action. In step 315, the investigation report is approved, which may cause the report's lifecycle to be promoted from one lifecycle (e.g. draft) to another lifecycle (e.g. approved). The change in lifecycle that may occur as a result of a workflow process step may in turn cause a storage action to be performed on the content. Thus, the block 340 illustrates a possible lifecycle action. Lifecycles and the performance of storage actions based on a change in lifecycle are explained in greater detail in the section "Change in Lifecycle." A workflow process step may also cause the occurrence of an event that may in turn result in the performance of a storage action (not illustrated). See the section "Occurrence of an Event" for more detail about how the occurrence of an event may cause the performance of a storage action. A workflow process step may also cause the occurrence of a change in metadata that may in turn result in the performance of a storage action (not illustrated). See the section "Change in Metadata" for more details about how a change in metadata may cause the performance of a storage action.

Whether the performance of a storage action is caused directly or indirectly by the workflow engine 105, the storage action is preferably performed by invoking one or more of the storage applications 125. See the section "Storage Applications" below for some examples of the storage applications 125.

Change in Lifecycle

Figure 4:
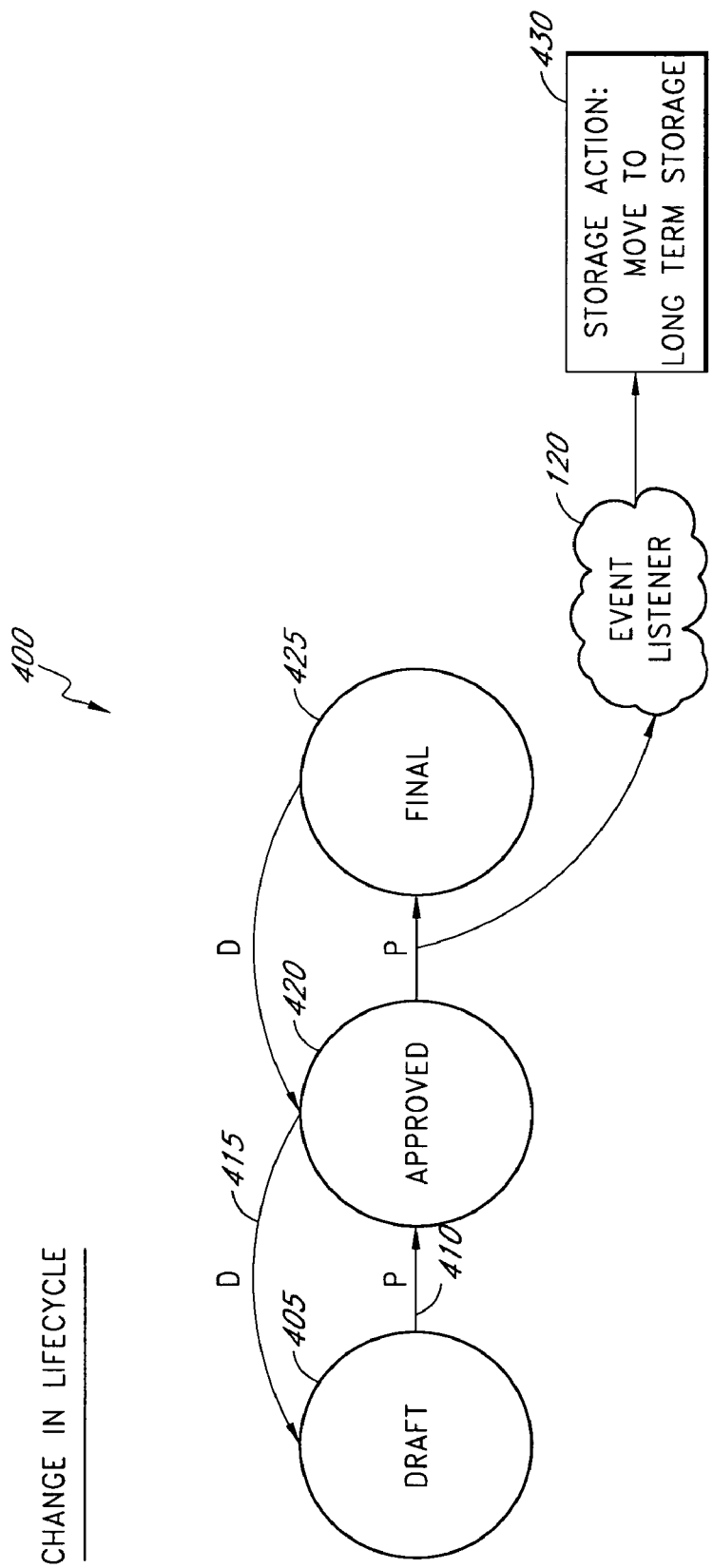
FIG. 4 is a diagram that illustrates how the occurrence of an event on an object may trigger a storage action to occur on the object, in accordance with one embodiment of an active storage and retrieval system.

Another occurrence that may result in the performance of a storage action is a change in lifecycle. A skilled artisan will appreciate, in light of this disclosure, that content in a business process management system passes through various stages during its lifecycle. FIG. 4 illustrates a simple lifecycle of one type of content, a document such as a report. As illustrated, the report may pass through three stages from its creation to its final form. The report may be created in a draft stage, as illustrated by the draft node 405. The report then may be edited and reviewed. Upon approval, the report changes its lifecycle from the draft stage to an approved stage. The approved stage is illustrated by an approved node 420. As the change in lifecycle from the draft stage to the approved stage advances the report's lifecycle, the transition is known as a "lifecycle promotion," illustrated by the edge 410. Upon further review, it is possible that the report may experience a "lifecycle demotion," illustrated by the edge 415, and return to the draft stage.

While the example report is "approved" when it has reached the approved node 420, the sample lifecycle of FIG. 4 includes a final stage, illustrated by the final node 425. This reflects the process of finishing reports, even after approval, before a report can be sent or published to an external entity. In many cases, when a report is approved, it goes through additional editing, such as, for example, professional typesetting or formalization of graphics, before it is sent outside an organization. In contrast, the approved stage may simply indicate that a report's text has been approved internally and that the report is ready for finalizing. As shown by the edges between the approved stage and the final stage, the report may be promoted to final from approved or may be demoted from final to approved.

A skilled artisan will appreciate, in light of this disclosure, that the illustrated lifecycle of FIG. 4 is merely an illustrative example of a content lifecycle that illustrates the concepts of lifecycle stages, lifecycle promotion, and lifecycle demotion. Advantageously, embodiments of the active storage and retrieval system 100 include a lifecycle module 110 that tracks lifecycle stages and changes in lifecycle. Preferably, the lifecycle module 110 supports many lifecycles in addition to the illustrated lifecycle. In one embodiment, the lifecycle module 110 allows a user to define a lifecycle for particular content or types of content, including lifecycle stages and conditions under which transitions from one lifecycle stage to another occur. Defined transitions may occur based on automatic detection of a condition, on user intervention (such as, for example, approval by a group of reviewers), or a combination of user intervention and automatic detection of a condition. In one embodiment, the lifecycle module 110 allows users to design content lifecycles based on a number of pre-defined lifecycles. Thus, a user may use one of the pre-defined lifecycles, may design a lifecycle from scratch, or may modify one of the pre-defined lifecycles.

As illustrated in FIG. 4, the event listener 120 is preferably configured to detect when a change in lifecycle has occurred. For example, as illustrated, the event listener 120 detects the promotion of particular content from the approved node 420 to the final node 425. The event listener then determines an appropriate storage action and causes the performance of the appropriate storage action. In the illustrated example, when the event listener 120 detects the promotion from approved to final, the event listener 120 causes the performance of a storage action that moves the finalized content to long-term storage. Advantageously, the storage action may be determined by referring at least in part to the content's storage policy. For example, in this case the storage policy of the content may have specified that the content is to be moved to long-term storage when the content has entered the final lifecycle. Advantageously, basing the decision at least in part on the storage policy allows for the design of storage policies that accurately determine the business value and need for appropriate storage based on particular content's lifecycle stage. For example, in this case the decision to move content to long-term storage based on the content's promotion to the final stage 425 may reflect a judgment that content that has been finalized is not likely to undergo further revision and therefore need not be stored in short-term storage.

A skilled artisan will appreciate, in light of this disclosure, that the foregoing judgment may be an accurate reflection of particular content's business value in some cases but not an accurate reflection of business value in other cases. For example, some reports, such as stock research reports accessed by outside entities via the Internet, may require constant access after being finalized. In such a case, the business value of content, and the need to access it rapidly, may increase rather than decrease, after finalization. In advantageous embodiments, therefore, the active storage and retrieval system 100 allows for user customization of storage policies by categories of content or by individual documents or files, such that an organization can accurately designate the business value of content and cause the active storage and retrieval system 100 to make more efficient decisions regarding which storage actions to perform on the content.

Although FIG. 4 does not show the event listener 120 detecting the lifecycle promotion from the draft stage to the approved stage, the lifecycle demotion from the approved stage to the draft stage, or the lifecycle demotion from the final stage to the approved stage, a skilled artisan will appreciate, in light of this disclosure, that each of these lifecycle changes may cause the performance of a storage action. Advantageously, the active storage and retrieval system 100 provides, in one embodiment, user flexibility in deciding which lifecycle changes cause a storage action. In one embodiment, the user defines which lifecycle changes cause storage actions by customizing the storage policies associated with particular content or types of content.

FIG. 4 illustrates one embodiment in which the event listener 120 detects a change in lifecycle and causes the performance of an appropriate storage action. See the section "Occurrence of an Event" for further detail regarding the operation of the event listener 120. In another embodiment, the lifecycle module 110 performs the function of detecting a change in lifecycle and causes the performance of an appropriate storage action. Accordingly, the event listener 120 is not necessary for performing a storage action based on a lifecycle change. Alternatively, the lifecycle module 110 can perform the function of detecting a change in lifecycle and causing the performance of an appropriate storage action in some cases while the event listener 120 may perform the same functions in other cases.

Whether the performance of a storage action is caused by the lifecycle module 110 or the event listener 120, the storage action is preferably performed by invoking one or more of the storage applications 125. See the section "Storage Applications" below for some examples of the storage applications 125.

Occurrence of an Event

Another occurrence that may result in the performance of a storage action is the occurrence of an event. As used herein, the term "event" encompasses the ordinary meaning of the term to a skilled artisan, including, without limitation, any action or occurrence resulting from user interaction, automatic operation, or both, that is detected by a computer environment. By way of illustration and not limitation, some examples of events that may be detected by the active storage and retrieval system 100 include checking content into a content repository, checking content out from a content repository, viewing content, filing content, and deleting content. A person of ordinary skill in the art will appreciate, in light of this disclosure, that many other events exist and may be detected. Indeed, as disclosed herein, the performance of a step in a workflow process, changes to content lifecycle, and changes to content metadata may each be represented as an event that may be detected by the active storage and retrieval system 100.

Figure 5:
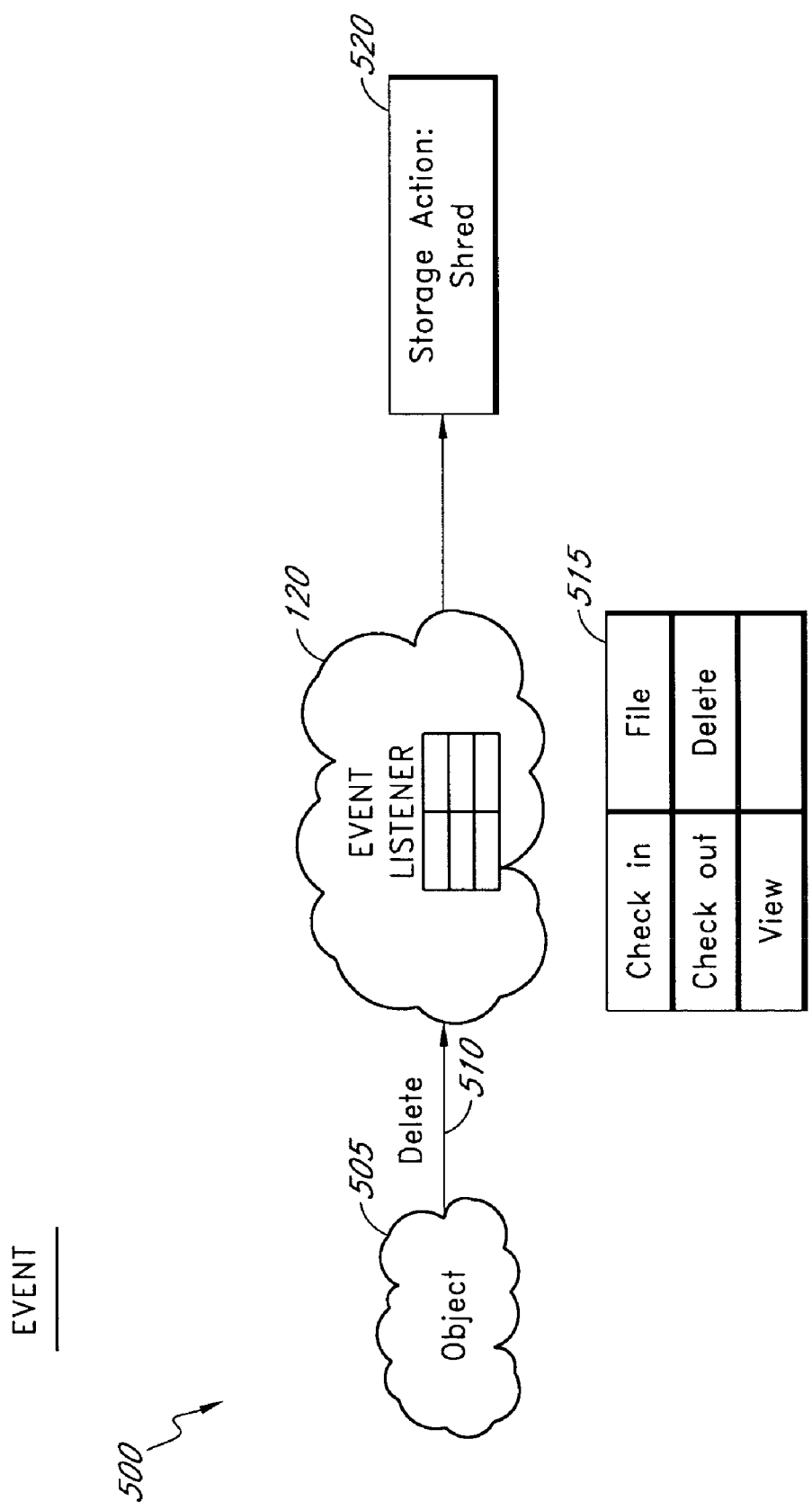
FIG. 5 is a diagram that illustrates how the occurrence of a process step associated with an object may trigger a storage action to occur on the object, in accordance with one embodiment of an active storage and retrieval system.

In general, in the context of the active storage and retrieval system 100, an event occurs as a result of an automatic process or user interaction with the content manager 115. FIG. 5 is a flow diagram that illustrates, in one embodiment, a process 500 in which an event may be detected in order to cause the performance of a storage action. In the process 500, a content object 505 may be the target of a delete event 510. That is, a user or an automated process may request the deletion of the object 505. As shown, the event listener 120 is configured to detect events 515 such as the delete event 510. The events 515 are illustrative and are not an exclusive list of the events that may be detected by the event listener 120. In one embodiment, the event listener 120 comprises one or more modules that preferably operate as continuous processes so as to be able to detect an event upon the occurrence thereof. Alternatively or additionally, one or more of the events that are detectable by the event listener 120 can be embodied in modules that invoke the event listener 120 such that a detectable event does not occur without the invocation of the event listener 120. For example, for an event that occurs because of user interaction with the content manager 115, such as checking content into a content repository, the modules executed by the content manager 115 in order to carry out the check-in process may include instructions that invoke the event listener 120.

As illustrated, the event listener 120 includes instructions regarding a plurality of events 515 and instructions regarding how to handle the occurrence of such events. In the illustrated example, the event listener 120 determines that the appropriate way to handle the occurrence of a delete event 510 is to invoke an electronic shredding storage action, as illustrated by a block 520.

Advantageously, the storage action may be determined by referring at least in part to the content's storage policy. For example, in this case the storage policy of the content may have specified that the content is to be electronically shredded rather than just deleted in order to protect the confidentiality of the content. Advantageously, basing the decision at least in part on the storage policy allows for the design of storage policies that accurately determine the business value of particular content. For example, in this case the decision to electronically shred the content may reflect a judgment that the content is highly sensitive and confidential information (such as, for example, information about a patient's visit to a hospital). A skilled artisan will appreciate, in light of this disclosure, that the foregoing judgment may be an accurate reflection of particular content's business value in some cases but not an accurate reflection of business value in other cases. For example, some information, such as publicly available newspaper articles, may not be seen as highly sensitive or confidential. In advantageous embodiments, therefore, the active storage and retrieval system 100 allows for user customization of storage policies by categories of content or by individual documents or files, such that an organization can accurately designate the business value of content and cause the active storage and retrieval system 100 to make better decisions regarding which storage actions to perform on the content.

When a storage action is caused by the event listener 120, the storage action is preferably performed by invoking one or more of the storage applications 125. Alternatively, rather than invoking the storage applications 125 through the event listener 120, the event listener 120 may be omitted and any event that would otherwise be detected by the event listener 120 may be embodied in one or more modules that directly determine one or more appropriate storage actions and invoke one or more appropriate storage applications 125. In another alternative embodiment, one or more events are embodied in one or more modules that directly invoke appropriate storage applications 125 while one or more other events are detected and handled by the event listener 120.

See the section "Storage Applications" below for some examples of the storage applications 125.

By way of illustration only and not limitation, the foregoing examples provide some of the events that may cause the performance of a storage action. A person of ordinary skill in the art will recognize, in light of this disclosure, that the active storage and retrieval system 100 may be configured such that any detectable event causes the performance of a storage action. The following paragraphs describe a non-exhaustive list of some of the events that cause the performance of a storage action in accordance with some embodiments.

In one embodiment, a "cancel checkout event" triggers a storage action when a reservation on particular content is canceled. In general, a "cancel checkout event" applies to documents, but it can also be applied to any type of content that may have a reservation on the content canceled.

In one embodiment, a "change class event" triggers a storage action when the class of particular content changes. A skilled artisan will appreciate, in light of this disclosure, that the "change class event" generally applies to content types that have classes. For example, some content types with classes that a "change class event" may apply to are documents, folders, and custom objects.

In one embodiment, a "change state event" triggers a storage action when the lifecycle state of particular content is changed. The "change state event" generally applies to documents. A skilled artisan will appreciate, in light of this disclosure, that the "change state event" may be relied upon, at least in part, to implement the ability to perform storage actions based on a change in lifecycle, as previously described.

In one embodiment, a "checkin event" triggers a storage action when particular content is checked in. In general, a "checkin event" applies to documents, but it can also be applied to any type of content that may be checked in.

In one embodiment, a "checkout event" triggers a storage action when particular content is checked out. In general, a "checkout event" applies to documents, but it can also be applied to any type of content that may be checked out.

In one embodiment, a "classify complete event" triggers a storage action when particular content has been processed by a classifier. In one embodiment, a classifier comprises an analysis engine, abiding by a set of rules, industry classifications, or an organized corpus, used to derive inferences and classify content based on those inferences. The classifier will use the set of rules to classify the content into the existing corpus. In general, a "classify complete event" applies to documents, but it can also be applied to any type of content that may be processed by a classifier.

In one embodiment, a "creation event" triggers a storage action when an instance of a class is created and saved. In general, a "creation event" applies to documents, folders, and custom objects, but it can also be applied to any type of content that may be created.

In one embodiment, a "custom event" triggers a storage action when a user-defined custom event occurs. A skilled artisan will appreciate, in light of this disclosure, that the active storage and retrieval system 100 may be configured such that any detectable event can cause the performance of a storage action. Accordingly, the active storage and retrieval system 100 can be configured such that a user may define one or more storage actions to be performed upon the occurrence of any user-defined detectable event. It is not necessary, however, for the active storage and retrieval system 100 to provide the ability to perform a storage action based on every possible detectable event. Thus, the active storage and retrieval system 100 may be configured to allow a user to specify one or more storage actions that are performed upon the occurrence of each of a subset of the possible detectable events.

In one embodiment, a "deletion event" triggers a storage action when particular content is deleted. In general, a "deletion event" applies to documents, folders, and custom objects, but it may also be applied to any type of content that may be deleted.

In one embodiment, a "demote version event" triggers a storage action when the version of particular content is demoted, such as, for example, to a minor version. A skilled artisan will appreciate, in light of this disclosure, that the "demote version event" applies to content for which versioning is enabled. In general, the "demote version event" applies to documents, but it can also be applied to any type of content whose version may be demoted.

In one embodiment, a "file event" triggers a storage action when particular content is filed in a folder, directory, or other structure for filing content. In general, the "file event" applies to folders, but it can also be applied to any type of content that acts as a structure for filing content.

In one embodiment, a "freeze event" triggers a storage action when a freeze method of particular content is called. In one embodiment, a "freeze method" comprises a method that makes the current content immutable, thus freezing the content at its current state and value for all time. In one embodiment, the freeze method cannot be undone. In general, the "freeze event" applies to documents, but it can also be applied to any type of content upon which a freeze method may be called.

In one embodiment, a "lock event" triggers a storage action when a lock method on particular content is called. In one embodiment, a "lock method" comprises a method that grants the caller an exclusive or shared lock on the document, allowing just the lock holder or holders the right to modify or update the content, in the case of a write lock. A skilled artisan will appreciate that other locks are possible, such as read locks, delete locks, and versioning locks. In general, the "lock event" applies to documents, folders, and custom objects, but it can also be applied to any type of content upon which a lock method may be called.

In one embodiment, a "promote version event" triggers a storage action when the version of particular content is promoted, such as, for example, to a major version. A skilled artisan will appreciate, in light of this disclosure, that the "promote version event" applies to content for which versioning is enabled. In general, the "promote version event" applies to documents, but it can also be applied to any type of content whose version may be promoted.

In one embodiment, an "unfile event" triggers a storage action when particular content is unfiled from a folder, directory, or other structure for filing content. In general, the "unfile event" applies to folders, but it can also be applied to any type of content that acts as a structure for filing content.

In one embodiment, an "unlock event" triggers a storage action when an unlock method on particular content is called. In one embodiment, an "unlock method" comprises a method that removes an exclusive or shared lock previously granted on a lock method. In general, the "unlock event" applies to documents, folders, and custom objects, but it can also be applied to any type of content upon which an unlock method may be called.

In one embodiment, an "update event" triggers a storage action when the properties of particular content are changed. In general, the "update event" applies to documents, folders, and custom objects, but it can also be applied to any type of content whose properties may be updated.

In one embodiment, an "update security event" triggers a storage action when the security settings of particular content are changed. For example, the "updated security event" may trigger a storage action when security permissions are changed. In general, the "update security event" applies to documents, folders, and custom objects, but it can also be applied to any type of content for which security settings may be changed.

Change in Metadata

Another occurrence that can result in the performance of a storage action is a change in metadata. As used herein, the term "metadata" encompasses the term's ordinary meaning to a skilled artisan, including, without limitation, any set of data that is associated with another set of data and that provides information about the other set of data. For example, metadata about a computer file may include data that represents the file's creation date, edit date, file size, and the like. A skilled artisan will appreciate, in light of this disclosure, that business process management systems include a large amount of metadata, in addition to the typical file system metadata listed above, in order to more precisely manage content. The content manager 115 of the embodiments described herein advantageously tracks and manages a large amount of metadata, consistent with typical business process management systems.

Advantageously, the additional metadata stored by the content manager 115 provides a more precise measurement of the business value of particular content than would be possible by relying solely on file system metadata. For example, while a typical file system could track the size, date of creation, and date of editing of a file representing an invoice, the content manager 115 can store metadata regarding the dollar amount of the invoice, the party responsible for paying the invoice, the matter to which the invoice relates, and the like. Thus, the metadata maintained by the content manager 115 provides more precise information regarding the substance of the data, which, in turn, allows the active storage and retrieval system 100 to make a more precise determination of the business value of the content. Advantageously, the active storage and retrieval system 100 is able to use this more precise business value determination to make better and more efficient decisions about which storage actions to perform on which content.

In one embodiment, the content manager 115 is configured to determine when a change in metadata occurs. For example, in the context of an invoice, the content manager 115 may detect that an invoice amount has been set for $10,000,000. Such a high invoice amount reflects a significantly high business value for the invoice content. That is, an organization likely considers that high value accounts have greater business value and thus would typically want to access such content more rapidly, provide greater security for such content, and the like. Thus, in one embodiment, when the content manager 115 detects that metadata reflects an invoice amount of $10,000,000, such a high value invoice may be moved to a robust replicated storage system that requires auditing of the invoice and detects modifications to the invoice.

Additionally, if the content manager 115 detects a change in metadata, such as a modification of an invoice amount from $10,000,000 to $1,000, the active storage and retrieval system 100 may cause the performance of a storage action that reflects the significant downgrading of the business value of the content. For example, one possible storage action in response to a drastic downward change in invoice amount would be to transmit an alert of the change to an account manager so that the account manager can audit the change and determine if a mistake has been made. Additionally or alternatively, the active storage and retrieval system 100 can cause the performance of a storage action that moves the formerly high value invoice from a robust replicated storage system that requires auditing of the invoice and detects modifications to the invoice to a standard short-term storage system (without extra security or replication).

In one embodiment, changes in metadata are treated as events that are handled by the event listener 120. Alternatively, changes in metadata can be detected by the content manager 115 and the content manager 115 can cause the performance of an appropriate storage action. Another alternative is that some changes in metadata can be detected by the content manager 115 and other changes can be detected by the event listener 120. In any case, the active storage and retrieval system 100 preferably determines an appropriate storage action at least in part by referring to one or more storage policies of the affected content. However, it is not required to refer to one or more storage policies.

Whether changes in metadata are detected by the event listener 120 or the content manager 115, the performance of storage actions preferably results from the invocation of one or more of the storage applications 125. See the section "Storage Applications" below for some examples of the storage applications 125.

Process of Performing a Storage Action in Response to a Workflow Process Step

Figure 6:
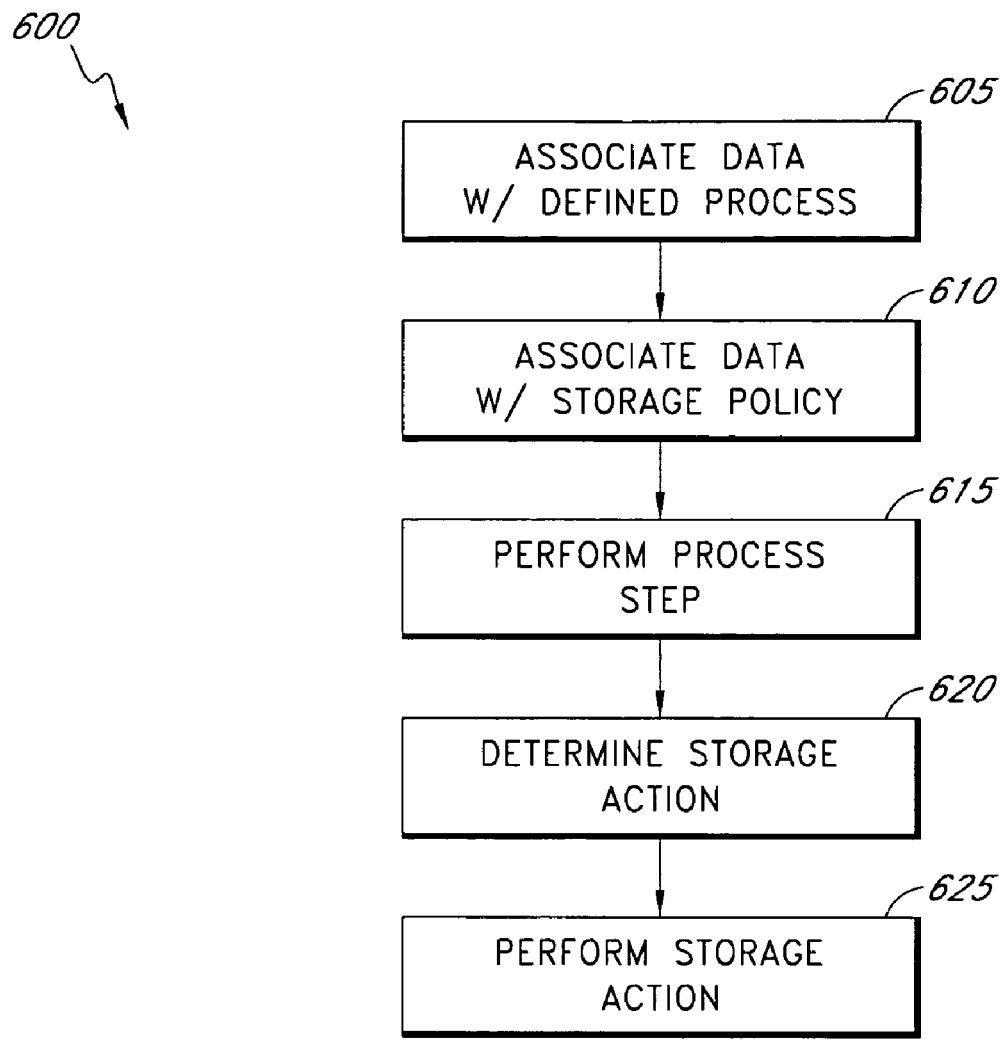
FIG. 6 is a flowchart that illustrates a process of performing a storage action triggered by a process step, in accordance with one embodiment of an active storage and retrieval system.

As set forth above, embodiments of the active storage and retrieval system 100 perform storage actions in response to a workflow process step performed by the workflow engine 105. FIG. 6 is a flowchart that illustrates a process of performing a storage action in response to a workflow process step. In one embodiment, a process of performing a storage action in response to a workflow process step 600 begins, in a block 605, with associating data with a defined workflow process. In one embodiment, the associated workflow process provides a number of steps that define how the associated data is to be processed. In a block 610, the process 600 associates data with a storage policy. In one embodiment, the associated storage policy defines appropriate storage actions to perform on the associated data under defined circumstances. In a block 615, the process 600 performs one of the process steps of the workflow process. In a block 620, the process 600 determines an appropriate storage action to perform on the data. In one embodiment, the determination of the appropriate storage action depends at least in part on the storage policy that has been associated with the data. In a block 625, the process 600 performs the storage action. In one embodiment, the storage action is performed by invoking one or more storage applications. In one embodiment, a workflow engine invokes the one or more storage applications. In one embodiment, an event listener invokes the one or more storage applications.

Process of Performing a Storage Action in Response to a Lifecycle Change

Figure 7:
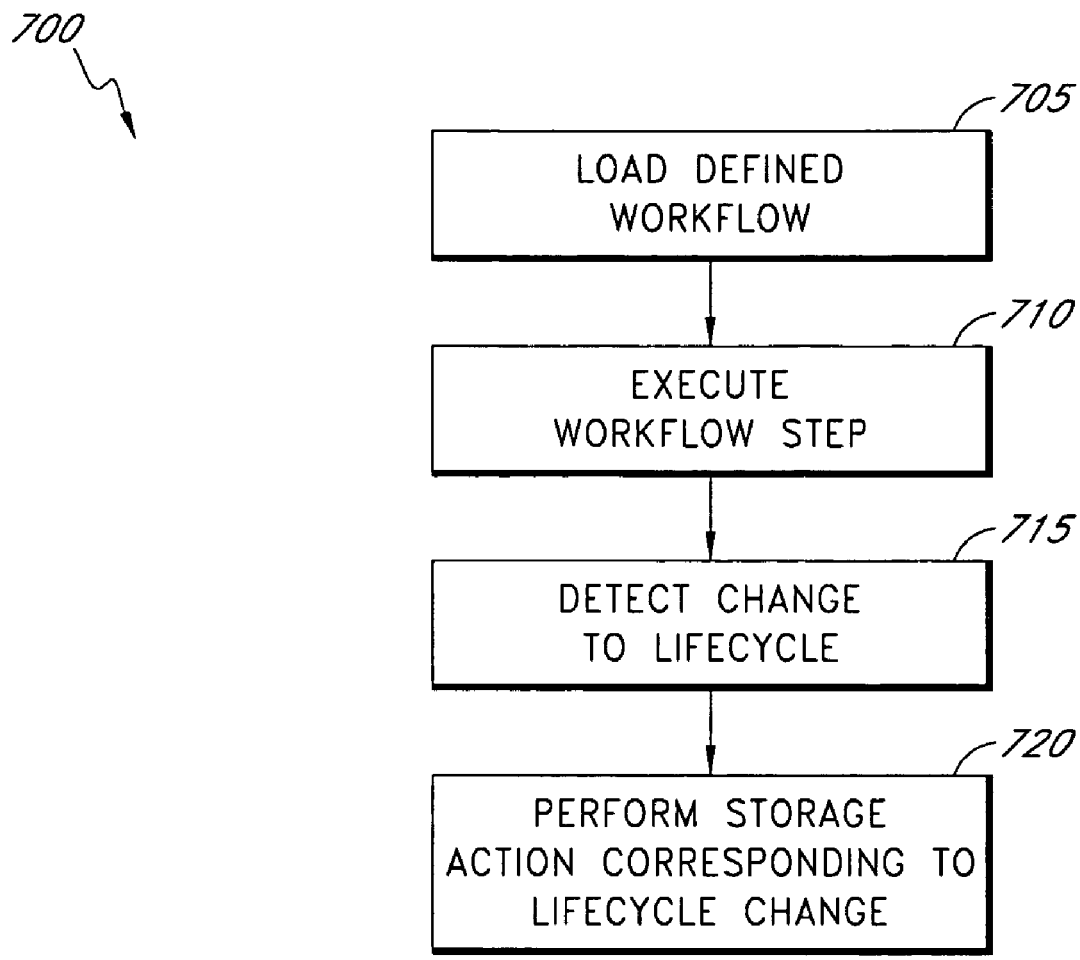
FIG. 7 is a flowchart that illustrates a process of performing a storage action triggered by a change in lifecycle of an object, in accordance with one embodiment of an active storage and retrieval system.

As set forth above, embodiments of the active storage and retrieval system 100 perform storage actions in response to content's change in lifecycle. FIG. 7 is a flowchart that illustrates a process of performing a storage action in response to a lifecycle change. In one embodiment, a process of performing a storage action in response to a lifecycle change 700 begins, in a block 705, with loading a defined workflow process. In a block 710, the process 700 executes a step in the workflow process. In a block 715, the process 700 detects a change in lifecycle that occurred to content associated with the workflow process. In one embodiment, the change in lifecycle occurs as a result of the execution of the step in the workflow process. In one embodiment, the change in lifecycle is detected by a lifecycle module such as the lifecycle module 110. In one embodiment, the change in lifecycle is detected, at least in part, by an event listener, such as the event listener 120. In a block 720, the process 700 performs a storage action corresponding to the lifecycle change. In one embodiment, the storage action corresponding to the lifecycle change is determined at least in part by referring to one or more storage policies associated with the content. In one embodiment, the storage action is performed at least in part by invoking one or more storage applications. In one embodiment, an event listener invokes the one or more storage applications. In one embodiment, a lifecycle module invokes the one or more storage applications.

Figure 8:
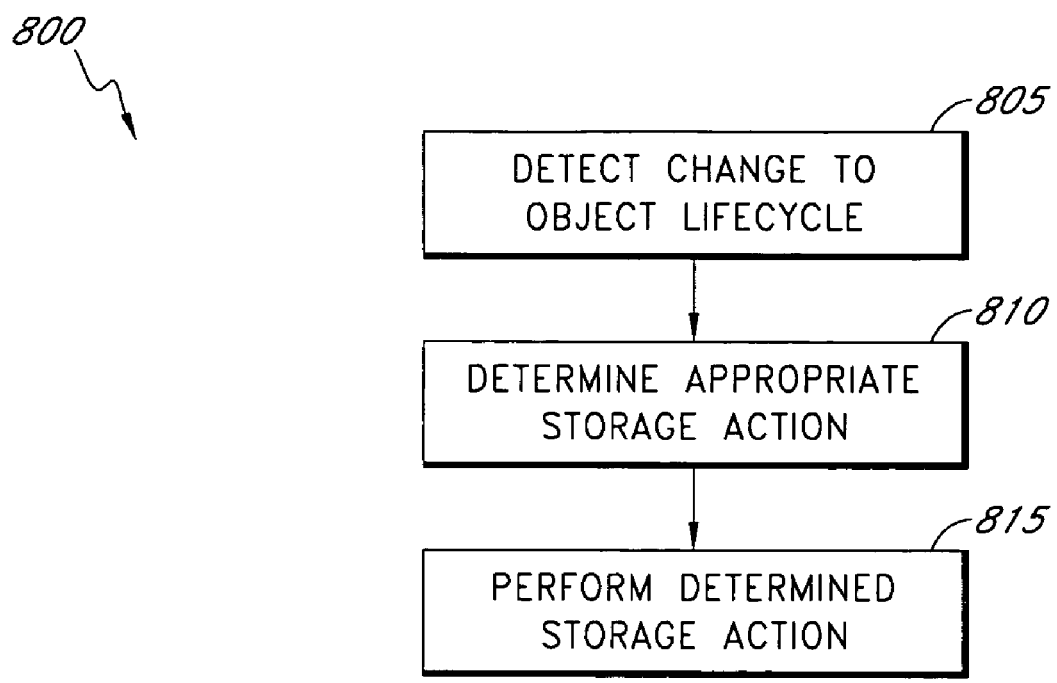
FIG. 8 is a flowchart that illustrates another process of performing a storage action triggered by a change in lifecycle of an object, in accordance with one embodiment of an active storage and retrieval system.

Another Process of Performing a Storage Action in Response to a Lifecycle Change FIG. 8 is a flowchart that illustrates another process of performing a storage action in response to a lifecycle change. A process performing a storage action in response to a lifecycle change 800 begins, in a block 805, with detecting a change in an object's lifecycle. In one embodiment, a lifecycle module detects the change in the object's lifecycle. In one embodiment, an event listener detects the change in the object's lifecycle. In a block 810, the process 800 determines an appropriate storage action to perform on the object. In one embodiment, the appropriate storage action is determined at least in part by referring to one or more storage policies associated with the object. In a block 815, the process 800 performed the determined storage action. In one embodiment, the determined storage action is performed at least in part by invoking one or more storage applications. In one embodiment, a lifecycle module invokes the one or more storage applications. In one embodiment, an event listener invokes the one or more storage applications.

Figure 9:
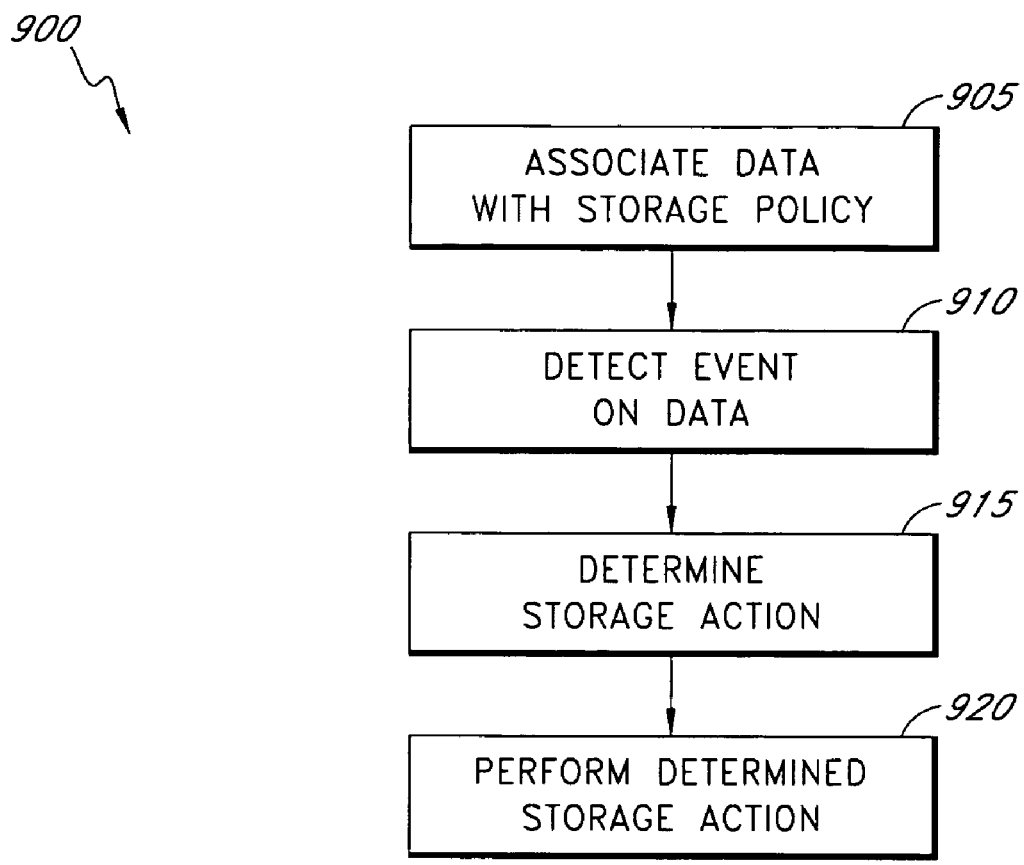
FIG. 9 is a flowchart that illustrates a process of performing a storage action triggered by the occurrence of an event on an object, in accordance with one embodiment of an active storage and retrieval system.

Process of Performing a Storage Action in Response to the Occurrence of an Event As set forth above, embodiments of the active storage and retrieval system 100 perform storage actions on content in response to the occurrence of an event on the content. FIG. 9 is a flowchart that illustrates a process of performing a storage action in response to the occurrence of an event on content. A process of performing a storage action in response to the occurrence of an event on content 900 begins, in a block 905, with associating data with one or more storage policies. In a block 910, the process 900 detects the occurrence of an event on the data. In one embodiment, an event listener detects the occurrence of the event on the data. In one embodiment, a content manager detects the occurrence of the event on the data. In a block 915, the process 900 determines an appropriate storage action to perform on the data. In one embodiment, the appropriate storage action is determined at least in part by referring to the one or more storage policies associated with the data. In a block 920, the process 900 performs the determined storage action on the data. In one embodiment, the determined storage action is performed on the data at least in part by invoking one or more storage applications. In one embodiment, a content manager invokes the one or more storage applications. In one embodiment, an event listener invokes the one or more storage applications.

Process of Performing a Storage Action in Response to a Change in Metadata of Content As set forth above, embodiments of the active storage and retrieval system 100 perform storage actions on content in response to a change in metadata associated with the content. A process of performing a storage action in response to a change in metadata begins with detecting a change in metadata associated with content. In one embodiment, the change in metadata comprises associating metadata with content that had not previously been associated with the content. Thus, in this embodiment, setting metadata for the first time constitutes a change in metadata. In one embodiment, an event listener detects the change in metadata. In one embodiment, a content manager detects the change in metadata. In another process step, the process determines an appropriate storage action to perform on the content. In one embodiment, the appropriate storage action is determined at least in part by referring to one or more storage policies associated with the content. In another process step, the process performs the determined storage action on the content. In one embodiment, the determined storage action is performed on the content at least in part by invoking one or more storage applications. In one embodiment, a content manager invokes the one or more storage applications. In one embodiment, an event listener invokes the one or more storage applications.

Storage Actions

While the examples in this disclosure have focused on a few storage actions, a skilled artisan will appreciate, in light of this disclosure, that many other storage actions may be performed. Examples of storage actions include, but are not limited to, moving content from one storage tier to another storage tier, applying a retention rule that is based on a fixed time, an event, or some other condition, encrypting content, electronically shredding content, replicating content, or indexing content.

In one embodiment, the storage action of applying a retention rule establishes a rule for retaining content in a particular storage tier. An example retention rule based on a fixed date is to retain particular content in short-term storage for three years. In one embodiment, when a retention period has expired for particular content (or when a specified event occurs or specified condition has been met), the content is moved to another storage tier, which may be specified by the retention rule or by a storage policy. Alternatively or additionally, content may be deleted or electronically shredded when a retention period has expired, an event occurs, or a specified condition is met.

In one embodiment, electronically shredding content comprises performing one or more delete operations, overwriting operations, and/or other operations that alter content such that the content cannot be recovered or cannot easily be recovered. A skilled artisan will appreciate, in light of this disclosure, that standard operating system delete operations do not necessarily remove content from storage such that the content cannot be recovered. A skilled artisan will also appreciate, in light of this disclosure, that complex techniques exist that can, in some cases, recover data even after it has been subjected to some commercially available shredding tools. Accordingly, in light of the phrase "cannot be recovered or cannot easily be recovered," the storage action of electronically shredding content may encompass a storage action that uses a commercially available shredding tool, even if the shredding tool does not render content completely unrecoverable. In one embodiment, the electronic shredding storage action complies with the DoD 5022.22 M standard for destroying content. Alternatively or additionally, the electronic shredding storage action may not comply with but is at least as effective in destroying content as the DoD 5022.22 M standard.

In one embodiment, encrypting content comprises applying at least one cryptographic function to the content using at least one public and/or private key in order to encode the content into an unreadable form such that the content must be decrypted using a cryptographic key before it can be read.

In one embodiment, replicating content comprises copying content from one storage tier to another storage tier. Storage tiers may be in the same locality, or, alternatively, geographically separated in order to provide protection against data loss in the event of accidental or intentional destruction of one copy, such as in a man-made or natural disaster. Alternatively or additionally, replication content may include copying content in a storage tier and storing the copy of the content in the same storage tier.

In one embodiment, indexing content comprises creating or modifying an index of content that aids in searching of the content.

Storage Applications

As described above, embodiments of the active storage and retrieval system 100 may perform storage actions, at least in part, by invoking one or more storage applications. The storage applications comprise one or more modules configured to carry out the specific storage action that is to be performed.

For example, appropriate storage applications for the action of moving content from one storage tier to another may comprise the standard operating-system functions for reading and writing data. Alternatively or additionally, storage applications for specialized or more secure moving of content from one storage tier to another may be provided. For example, in one embodiment, the active storage and retrieval system 100 may provide a storage application that complies with a secure standard for transmitting data, such as, for example, the HTTPS protocol. A skilled artisan will appreciate, in light of this disclosure, that other protocols exist for transmitting data, securely or otherwise, and that the storage applications may support any or all of these protocols.

Appropriate storage applications for the action of encrypting content may include commercially available encryption tools, including, for example, tools that implement one or more of the following encryption algorithms and/or standards: DES, RSA, AES, Blowfish, and symmetric encryption.

Appropriate storage applications for the action of electronically shredding content may include commercially available shredding tools, including, for example, tools that implement one or more of the following shredding algorithms and/or standards: DoD 5022.22 M, QDS DEL93.25-S, or DSD ACSI33 Sec 605.

A skilled artisan will appreciate, in light of this disclosure, that a number of commercially available storage applications for accomplishing the listed storage actions and other storage actions are readily available, including a number of storage applications that comprise standard tools of commonly-used operating systems. Any or all of such commercially available storage applications may be used to advantage in embodiments of the active storage and retrieval system 100.

Application Layer Compared to Storage Layer

One advantage of embodiments of the active storage and retrieval system 100 described herein is that decisions about where or how to store content can be made based, at least in part, on information about content that is available at an application layer but not available at a storage layer. As used herein, the term "application layer" encompasses the term's ordinary meaning to a skilled artisan, including, without limitation, the applications and modules that interact with and substantively modify content. Thus, for example, the workflow engine 105, as described above, is part of the application layer because it defines and performs process steps on content that substantively modify the content. In contrast, the term "storage layer" refers to basic file system operations and interfaces to storage hardware that perform basic read and write functions on raw data and have access to file system statistics such as file size, date created, date edited, and the like, but that do not have access to more detailed and substantive information about content.

Systems that rely solely on information available at a storage layer, such as, for example, file system statistics, are not able to determine the business value of content at the level of precision allowed by the embodiments of the active storage and retrieval system 100 described herein. Rather, it is the substantive information that can be accessed at the application layer but not at the storage layer that provide the level of precision enjoyed by embodiments of the active storage and retrieval system 100. Thus, for example, the workflow engine 105 can determine the business value of content with greater precision because business value correlates more accurately with steps in a business process than with file system statistics. That is, while the business value of an investigation report that has been approved by an organization is apparent, the business value of the same report is not apparent simply from information showing that the report was modified five minutes ago. Similarly, the application layer information available to the lifecycle module 110, the content manager 115, and the event listener 120 correlates accurately with the business value of content and allows embodiments of the active storage and retrieval system 100 to make a more accurate determination about the business value of content.

In view of these and other advantages, a skilled artisan will appreciate the usefulness of providing a content management system that can differentiate the business value of content based on application layer information rather than just storage layer information. Of course, a skilled artisan will also appreciate that the use of application layer information does not preclude the use of storage layer information. Accordingly, embodiments of the active storage and retrieval system 100 may make decisions regarding business value and appropriate storage actions to perform based on some combination of application layer information and storage layer information. In such embodiments, the reliance on application layer information in addition to storage layer information provides advantages over the use of storage layer information alone.

Flexibility of Implementation

A skilled artisan will appreciate that the examples above illustrate an active storage and retrieval system 100 that is implemented as one or more computer software modules that are embodied in and executed by one or more general purpose computers. As used herein, the term "module" encompasses the term's ordinary meaning to a person of ordinary skill in the art, including, without limitation, a set of one or more software instructions configured to cause, when executed, a general purpose computer to perform one or more defined operations. A skilled artisan will appreciate that the general term "module" encompasses many units of organization of computer instructions, including, for example, methods, procedures, functions, subroutines, and the like. Further, a "module" may comprise instructions from more than one method, procedure, function, subroutine, or the like, but that collectively define a particular operation. As such, the "modules" described in this application can be merged together or broken into additional modules without departing from the principles set forth herein.

A skilled artisan will appreciate, in light of this disclosure, that the processes, functions, and operations described herein may be encoded in computer-readable instructions on one or more computer-readable media such that the instructions cause a computer, when executed, to perform the processes, functions, and operations defined by the instructions. Further, the instructions may be encoded in compiled form or may require an interpreter for execution on a computer.

A skilled artisan will appreciate, in light of this disclosure, that one or more of the components that are illustrated as part of the active storage and retrieval system 100 may be housed in one computer or may be distributed across two or more computers. Further, while a preferred embodiment includes each of the components illustrated on FIG. 1, a skilled artisan will appreciate, in light of this disclosure, that advantageous embodiments exist in which one or more of the components is omitted. For example, the active storage and retrieval system 100 may omit a lifecycle module (and the associated ability to perform a storage action based on a change in object lifecycle) while still retaining the advantages associated with the workflow engine 105, the content manager 115, the event listener 120, and the storage applications 125. As such, while preferred embodiments are described herein, a skilled artisan will appreciate, in light of this disclosure, that each component is optional unless this disclosure specifically states that a component is necessary.

While the embodiments described herein are implemented in software for execution on a general purpose computer, a skilled artisan, will appreciate, in light of this disclosure, that any software component can also be implemented, in whole or in part, in firmware, hardware, or some combination of software, firmware, and hardware. Further, a skilled artisan will appreciate that one or more specialized computers, configured specifically to perform one or more of the calculations described herein, may be used in place of or in combination with one or more general purpose computers.

Accordingly, these and other alternative embodiments appreciated by a skilled artisan in light of this disclosure are within the scope of this disclosure. The foregoing embodiments are described by way of illustration only and do not limit the invention to the particular embodiments described.

What is claimed is:

1. A method of managing storage of a data item, the method comprising:
    at an active storage and retrieval system executed by a computer and coupled to storage tiers:
        storing storage policies that each are associated with a class of content, define at least an initial storage tier for storing a data item, and that specify, for each of multiple circumstances, a storage action to be performed on the data item when the circumstance occurs;
        associating a data item with a storage policy from the stored storage policies based on a class of content of the data item that matches the class of content of the storage policy;
        detecting, by an event listener, that a circumstance specified in the storage policy has occurred;
        in response to detecting that the circumstance specified in the storage policy has occurred, making a storage decision about the data item using the storage policy and based on a business value of the data item that is based on application layer factors of an event that has occurred on the data item, performance of a process step, a change in lifecycle of the data item, and a change in metadata about the data item; and
        in response to making the storage decision, performing a storage action on the data item.

2. The method of claim 1, wherein performing the storage action comprises moving the data item from the initial storage tier to a second storage tier.

3. The method of claim 1, wherein performing the storage action comprises encrypting the data item.

4. The method of claim 1, wherein performing the storage action comprises electronically shredding the storage action.

5. The method of claim 1, wherein performing the storage action comprises changing a security level of the data item.

6. A method of managing storage of a data item, the method comprising:
    at an active storage and retrieval system executed by a computer and coupled to storage tiers:
        storing storage policies that each are associated with a class of content, define at least an initial storage tier for storing a data item and that specify, for each of multiple circumstances, a storage action to be performed on the data item when the circumstance occurs;
        creating at least one data item associated with at least one defined workflow process, wherein the workflow process provides a number of steps that define how the data item is to be processed;
        associating the data item with a storage policy from the stored storage policies based on a class of content of the data item that matches the class of content of the storage policy;
        performing a step in the defined workflow process;
        detecting, by an event listener, the performance of the step in the defined workflow process;
        in response to detecting that the step contains an embedded command that determines a storage action to perform, performing a storage action associated with the step; and
        in response to performance of the step causing a change in lifecycle of the data item, a change in metadata of the data item, or an event, performing a storage action based on the change using the storage policy.

7. The method of claim 6, wherein performing the storage action comprises moving the data item from the initial storage tier to a second storage tier.

8. The method of claim 6, further comprising invoking at least one storage application configured to perform the determined storage action.

9. The method of claim 6, further comprising invoking, by at least one workflow engine, at least one storage application configured to perform the determined storage action.

10. A data storage management system comprising:
    storage tiers; and
    an active storage and retrieval system coupled to the storage tiers, comprising:
        storage policies that each are associated with a class of content, define at least an initial storage tier for storing a data item, and that specify for each of multiple circumstances, a storage action to be performed on the data item when the circumstance occurs;
        at least one workflow engine configured to manage a plurality of defined business processes and to execute at least one process step associated with at least one data item;
        at least one lifecycle module configured to detect a change in lifecycle of the at least one data item;
        at least one content manager to store metadata about the at least one data item; and
        at least one storage application configured to:
            detect, by an event listener, that a circumstance specified in a storage policy has occurred by detecting that at least one of an event has occurred on the data item, performance of a process step, a change in lifecycle of the data item, and a change in metadata about the data item;
            in response to detecting that the circumstance specified in the storage policy has occurred with reference to a data item, make a storage decision about the data item using the storage policy and based on a business value of the data item that is based on application layer factors of an event that has occurred on the data item, performance of a process step, a change in lifecycle of the data item, and a change in metadata about the data item; and
            in response to making the storage decision, perform a storage action on the data item.

11. The system of claim 10, wherein the storage action comprises moving the data item from a first storage tier to a second storage tier.

12. The system of claim 10, wherein the storage action comprises replicating the data item.

13. The system of claim 10, wherein the storage action comprises encrypting the data item.

14. The system of claim 10, further comprising
in response to detecting that an event has occurred to the data item, performing the at least one storage action associated with the event using the storage policy.

15. A system managing data storage, comprising:
an active storage and retrieval system coupled to storage tiers, wherein the active storage and retrieval system comprises a workflow engine, a lifecycle module, and a content manager, and wherein the active storage and retrieval system is configured to:
store storage policies that each are associated with a class of content, define at least an initial storage tier for storing a data item, and that specify, for each of multiple circumstances, a storage action to be performed on the data item when the circumstance occurs;
associate a data item with a storage policy from the stored storage policies based on a class of content of the data item that matches the class of content of the storage policy;
detect, by an event listener, that a circumstance specified in the storage policy has occurred;
in response to detecting that the circumstance specified in the storage policy has occurred, make a storage decision about the data item using the storage policy and based on a business value of the data item that is based on application layer factors of an event that has occurred on the data item, performance of a process step, a change in lifecycle of the data item, and a change in metadata about the data item; and
in response to making the storage decision, performing a storage action on the data item.

16. The system of claim 15, wherein the system is configured to make the decision based on a combination of information about the data that is available at the application layer and information about the data that is available at the storage layer.

17. The system of claim 15, wherein the information about the data available at the application layer comprises information derived at least in part from operation of the workflow engine.

18. The system of claim 15, wherein the information about the data available at the application layer further comprises information derived at least in part from operation of the lifecycle module.

19. The system of claim 15, wherein the information about the data available at the application layer further comprises information derived at least in part from operation of the content manager.

* * * * *